United States Patent [19]

Firey

[11] Patent Number: 5,027,752

[45] Date of Patent: Jul. 2, 1991

[54] PRIMARY AIR PREHEATER FOR CHAR BURNING ENGINES

[76] Inventor: Joseph C. Firey, P.O. Box 15514, Seattle, Wash. 98115-0514

[21] Appl. No.: 610,110

[22] Filed: Nov. 7, 1990

[51] Int. Cl.5 .............................................. F02B 45/02
[52] U.S. Cl. .................................... 123/23; 123/27 R
[58] Field of Search ...................... 123/3, 23, 27 R, 64, 123/556; 60/39.12

[56] References Cited

U.S. PATENT DOCUMENTS 4,653,436  3/1987  Firey ...................................... 123/23
4,698,069 10/1987  Firey ...................................... 123/23

Primary Examiner—Noah P. Kamen

[57] ABSTRACT

An air preheater is described which surrounds the char fuel reaction chamber of a char burning engine as an insulating layer, and through which the primary air passes to be preheated therein. By thusly preheating the primary air and insulating the char fuel reaction chamber a larger portion of the char fuel is maintained at or above its rapid reaction temperature. More complete char fuel burnup and more efficient combustion is obtained in this way.

5 Claims, 2 Drawing Sheets

PRIMARY AIR PREHEATER FOR CHAR BURNING ENGINES

CROSS REFERENCES TO RELATED APPLICATIONS

The invention described herein is related to my U.S. Patent application entitled, Several Flow Passages With Different Connection Places for Cyclic Solid with Gas Reactors, Ser. No. 07/468121, filed Jan. 22, 1990, and also to my U.S. Patent Application entitled, Improved Starting Means For Char Burning Engines, Ser. No. 07/471599, filed Jan. 29, 1990.

BACKGROUND OF THE INVENTION

1. Field of the Invention

This invention is in the field of internal combustion engines and particularly the field of internal combustion engines burning solid fuels alone or in combination with liquid or gaseous fuels.

2. Description of the Prior Art

Prior art examples of char burning engines are described in the following U.S. Patents issued to applicant:

U.S. Pat. No. 4,372,256, Feb. 8, 1983
U.S. Pat. No. 4,412,511, Nov. 1, 1983
U.S. Pat. No. 4,698,069, Oct. 6, 1987
U.S. Pat. No. 4,794,729, Jan. 3, 1989

Char burning engines are described in these patents wherein char fuel, contained within a char fuel reaction chamber, is cyclically compressed with air followed by expansion of the product gases resulting from reaction of char fuel with compressed air. Most char fuels will react appreciably with the oxygen gas in the compressed air only when at a sufficiently high temperature, of the order of 900° F. to 1000° F., and will react rapidly with the oxygen gas in the compressed air only when at a higher temperature, of the order of 1200° F. to 1800° F.

Examples of char burning engines are described in general in U.S. Pat. No. 4,412,511, column 7, line 21 through column 11, line 45, and this material is incorporated herein by reference thereto. Such char burning engines comprise a char fuel reaction chamber into which char fuel is placed by a refuel mechanism via a refuel end and from which ashes are removed by an ash removal mechanism via an ash removal end and the char fuel reacts with oxygen in adjacent compressed gases within this char fuel reaction chamber.

The terms, internal combustion engine, and, internal combustion engine mechanism, are used herein and in the claims as defined in U.S. Pat. No. 4,412,511, column 1, line 65 through column 2, line 45, and this material is incorporated herein by reference thereto.

In some internal combustion engine mechanisms a reciprocating piston is operated within a cylinder as a combined means for compressing and expanding the gases, and the space enclosed by the piston crown and the cylinder walls is frequently also a reaction chamber wherein secondary reactions may occur during expansion. In this case the volume of this secondary reaction chamber varies cyclically and is a portion of the combined means for cyclically compressing and expanding gases. For multicylinder internal combustion mechanisms several combined means for compressing and expanding are joined together.

When such combined means for compressing and expanding the gases are used, each compression process occurs over a compression time interval during which the variable volume chamber decreases in volume and this is immediately followed by an expansion process occurring over an expansion time interval during which the variable volume chamber increases in volume.

For piston and cylinder mechanisms a crank and connecting rod, or equivalent mechanism, is used as a drive means for driving the internal combustion engine mechanism and the combined compressing and expanding means portion thereof through repeated cycles of compression followed by expansion. Various kinds of drive means and variable volume chamber means for compressing and expanding gases can be used such as the Wankel mechanism and the free piston mechanism as described, for example, in U.S. Pat. No. 4,372,256.

The term, oxygen gas, is used herein and in the claims as defined in U.S. Pat. No. 4,509,957, column 3, line 1 through line 8, and this material is incorporated herein by reference thereto.

The term, char fuel, is used herein and in the claims as defined in U.S. Pat. No. 4,412,511, column 2, line 46 through line 66, and this material is incorporated herein by reference thereto.

The term, changeable gas flow connection, is used herein and in the claims to means gas flow passages which can be opened or closed while the engine is running. The term, fixed open gas flow connection is used herein and in the claims to mean gas flow passages which remain open whenever the engine is running.

In many types of char burning engines combustion occurs in two steps: a primary reaction between the char fuel mass within the primary reaction chamber and oxygen in the primary air mass compressed into the primary reaction chamber during each compression process; and a following secondary reaction between the primary reaction products, emerging from the primary reactor during expansion, and oxygen in the secondary air mass retained in the secondary reaction chamber which may be the variable volume portion of the combined means for compressing and expanding. In one preferred form of char burning engine the primary reaction chamber is contained within a pressure vessel container which is separate from the combined means for compressing and expanding. This separate pressure vessel container must be cooled to prevent excess temperature rise and consequent weakening of the pressure vessel container walls due to transfer of heat from the primary reaction within the char fuel mass. But such cooling of the primary reactor pressure vessel container necessarily increases the rate of heat transfer out of the char fuel mass within the primary reactor. In this way some portions of the char fuel mass within the primary reactor may become cooled below their rapid reaction temperature. These cooled portions of char fuel may then not be completely reacted before removal and the fuel efficiency of the engine is reduced in consequence. It would be desirable to have a means for reducing the rate of heat transfer out of the char fuel mass which did not also increase unduly the temperature of the pressure vessel container.

Fresh char fuel and the primary air mass enter the primary reactor initially much colder than the existing char fuel mass undergoing primary reaction at its rapid reaction temperature and in this way act also to cool the char fuel mass. It would be further desirable to have a means for preheating the primary air mass and also the fresh char fuel being added into the primary reactor.

SUMMARY OF THE INVENTION

Air preheater means are described for directing the primary air mass to pass through an air preheater passage while being compressed by the combined compressor and expander means into the primary reaction chamber. This air preheater passage surrounds an enclosure containing the primary reaction chamber and the char fuel mass therein. In this way the air preheater passage functions also as an insulator of the primary reaction chamber as well as a means for preheating the primary air mass which is about to react with the char fuel mass. Heat loss from the primary reaction chamber is thus reduced and the consequently higher char fuel and primary air temperatures yield a more rapid primary reaction of char fuel with oxygen in the compressed primary air mass and this is one of the beneficial objects of this invention.

So that all of the primary air mass, and only the primary air mass, is thusly preheated separate undirectional flow passages connect the variable volume chamber of the combined compressor and expander means to the primary reaction chamber in a preferred form of this invention. In one separate flow passage all primary air flows from the variable volume chamber undirectionally into the air preheater and on through the inlet of the primary reaction chamber during compression. During expansion the primary reacted gases flow unidirectionally through another separate flow passage out of the primary reaction chamber outlet and into the variable volume chamber of the combined compressor and expander means. In this way all of the primary air mass and only the primary air mass passes through the preheater and this is another beneficial object of this invention which yields maximum preheat of the primary air.

By locating the inlet of the primary reaction chamber near the ash removal end and the outlet of the primary reaction chamber near the refuel end the gases flow unidirectionally through most of the length of the char fuel mass. In this preferred way the fresh char fuel entering the primary reaction chamber is heated, by the hot primary reacted gases, up to the rapid burning temperature of the char fuel thus maintaining a rapid primary reaction.

DESCRIPTION OF THE PREFERRED EMBODIMENTS

Figure 1:
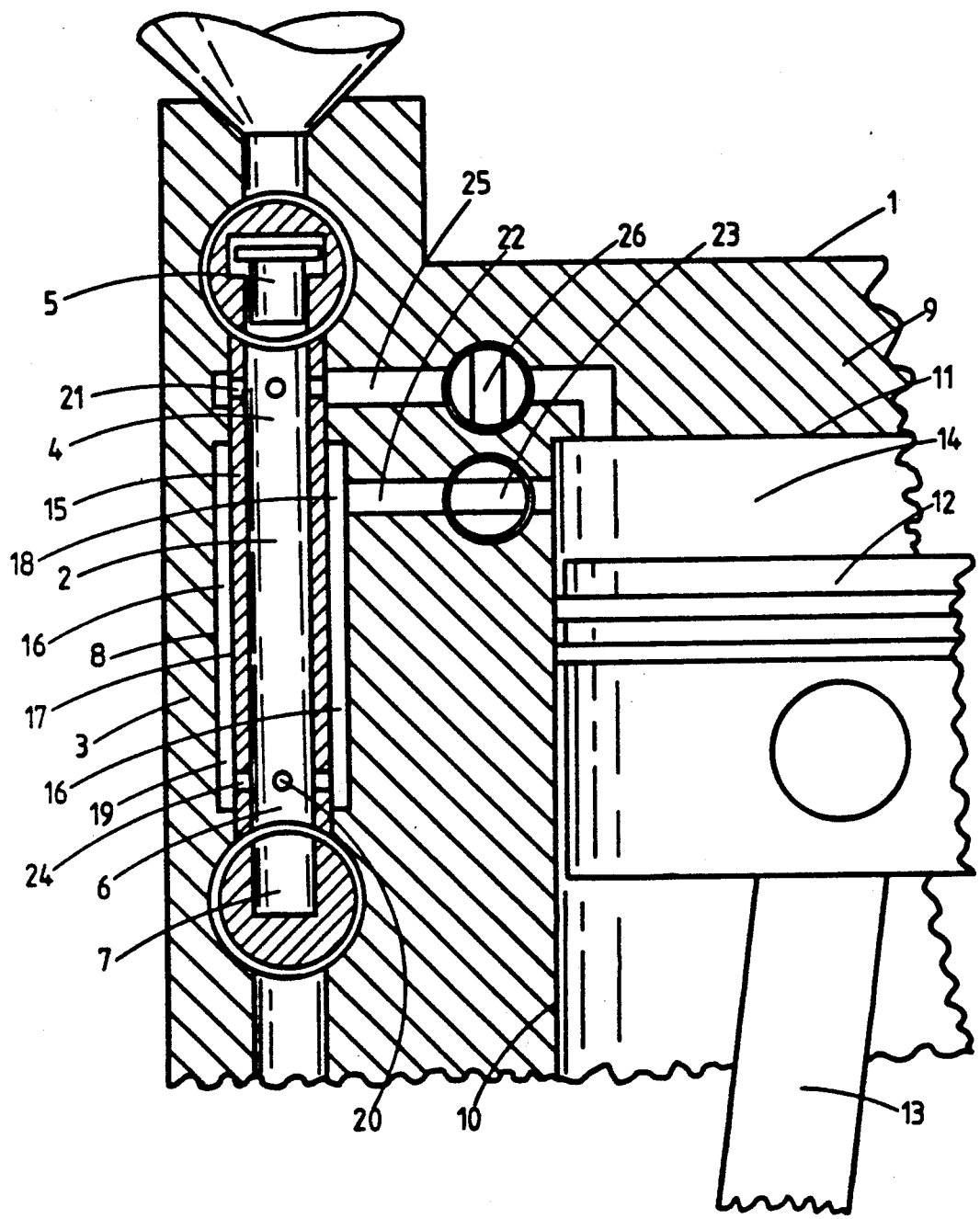

All forms of this invention comprise the following elements:

A. A char burning engine wherein the char fuel reaction chamber is contained within a pressure vessel separate from the combined means for compressing and expanding gases and comprising:
  1. A char fuel reaction chamber supplied with char fuel via a refuel end by a refuel mechanism and from which ashes are removed via an ash removal end by an ash removal mechanism. The char fuel reaction chamber is contained within a pressure vessel container which has an inner surface.
  2. A combined means for compressing and expanding gases comprising an internal combustion engine mechanism comprising a variable volume chamber for compressing and expanding gases and drive means for driving the internal combustion engine mechanism to vary the volume of the variable volume chamber through repeated cycles of compression followed by expansion. Several gas flow connections are provided into the variable volume chamber, such as an air intake connection, an exhaust gas discharge connection, and connections for the char fuel reaction chamber to connect into.
  3. Examples of char burning engines are described in the prior art references listed in the Background of the Invention hereinabove.

B. A char fuel enclosure means for enclosing the char fuel is positioned, by a means for positioning, inside the pressure vessel container with a heater gas flow passage separating most of the inner surface of the pressure vessel container from most of the outer surface of the char fuel enclosure means. The char fuel enclosure means comprises an enclosure gas flow inlet, an enclosure gas flow outlet, a refuel end through which char fuel is added thereinto and an ash removal end through which ashes are removed therefrom. The heater gas flow passage has an inlet end and an outlet end.

C. Gas flow connecting means are provided between the variable volume chamber of the combined compressor and expander, the heater gas flow passage, and the char fuel enclosure means so that during compression, air flows from the variable volume chamber only into the inlet of the heater gas flow passage and from the outlet of the heater gas flow passage into the inlet of the char fuel enclosure. In this way only that air mass being compressed into the char fuel mass passes through the heater gas flow passage to be preheated therein.

Preferred forms of this invention further comprise the following additional elements:

D. Gas flow connecting means are provided between the variable volume chamber of the combined compressor and expander, the heater gas flow passage, and the char fuel enclosure means so that:
  1. During expansion reacted gas from the char fuel reaction chamber flows via the char fuel reaction chamber outlet only into the variable volume chamber of the combined compressor and expander via a separate gas flow connecting means. In this way gases flow unidirectionally through the char fuel enclosure from the inlet to the outlet.
  2. To secure the above described gas flow directions the following gas flow means for connecting are used:
    a. A first unidirectional flow means for connecting the inlet of the heater gas flow passage to the variable volume chamber of the combined compressor and expander. The unidirectional flow in this first connector is only from the variable volume chamber into the heater gas flow passage.
    b. A means for connecting the outlet of the heater gas flow passage to the gas flow inlet of the char fuel enclosure.
    c. A second separate unidirectional flow means for connecting the gas flow outlet of the char fuel enclosure to the variable volume chamber of the combined compressor and expander. The unidirectional flow in this second connector is only from the char fuel enclosure into the variable volume chamber.
    d. The desired unidirectional flow can be secured by use of check valves or timed driven valves as is well known in the art of unidirectional flow connecting means.

E. In one particular preferred form of this invention the gas flow inlet to the char fuel enclosure is located at the ash removal end and the gas flow outlet from the char fuel enclosure is located at the refuel end. In this way the unidirectional gas flow through the char fuel enclosure is from the ash removal end toward the refuel end. The hot reacted gases formed in the char fuel reaction chamber thus flow over the fresh incoming char fuel at the refuel end and this char fuel is thusly preheated up to its rapid reaction temperature.

So that a char burning engine can be operated at reasonably high cycling speeds of 400 to 1800 cycles per minute or more, it is necessary during starting to bring the char fuel in the char fuel reaction chamber at least up to its rapid reaction temperature with oxygen gas in the compressed primary air mass. Char fuels differ in their rapid reaction temperatures, but most char fuels will react rapidly with compressed air at temperatures of 1200° F. to 1800° F., and thus we seek to reach and maintain a least these char fuel temperatures in the char fuel reaction chamber.

The char fuel in the char fuel reaction chamber is heated by its reaction with oxygen gas in the compressed primary air mass, and is cooled by heat transfer through the reaction chamber walls, by the need to heat up each incoming primary air mass, and by the need to heat up each fresh char fuel mass being refueled. The improvements to char burning engines achieved by this invention act to reduce these char fuel cooling effects and thus to increase the temperature of the char fuel in the char fuel reaction chamber as follows:

1. The heater gas flow passage surrounds most of the char fuel enclosure and, with air therein, functions as an insulation layer to reduce transfer of heat out of the char fuel mass within the char fuel enclosure.

2. Such heat as is transferred out of the char fuel mass and into the primary air mass passing through the heater gas flow passage acts to increase primary air temperature and thus to reduce the cooling effect when primary air is brought up to char fuel temperature within the char fuel reaction chamber. Maximum temperature rise of the primary air mass combined with maximum insulating effect of the heater gas flow passage are achieved by passing only the primary air mass through the heater gas flow passage.

3. With unidirectional flow of gases through the char fuel mass within the char fuel reaction chamber from the ash removal end toward the refuel end the hot reacted primary reaction gases flow through the fresh char fuel being refueled and increase the temperature thereof. In this way the cooling effect of bringing this char fuel up to its rapid reaction temperature is reduced.

In one or more of these several ways the devices of this invention function to achieve the several beneficial objects sought by increase of the temperature of the char fuel mass.

One particular preferred example of this invention is shown in FIG. 1 and comprises:

A. A char burning engine, 1, comprising a char fuel reaction chamber, 2, contained within a pressure vessel container, 3, and supplied with char fuel via the refuel end, 4, by a refuel mechanism, 5, and from which ashes are removed via the ash removal end, 6, by an ash removal mechanism, 7. The pressure vessel container, 3, is separate from the combined means for compressing and expanding and has an inner surface, 8.

The char burning engine, 1, further comprises a combined means for compressing and expanding gases, 9, which comprises an internal combustion engine mechanism, such as an assembly of cylinder, 10, cylinder head, 11, piston, 12, connecting rod, 13, and a variable volume chamber, 14, enclosed within the internal combustion engine mechanism. The combined means for compressing and expanding, 9, comprises a drive means for driving the piston, 12, back and forth within the cylinder, 10, and thus for varying the volume of the variable volume chamber, 14, through repeated cycles of compression, when the variable volume is reducing, and expansion when the variable volume is increasing. Only the connecting rod, 13, portion of the example drive means is shown in FIG. 1, the crankshaft and other portions being well-known in the art of internal combustion engine mechanisms.

B. A char fuel enclosure means, 15, is positioned within the pressure vessel container, 3, with a heater gas flow passage, 16, separating most of the outer surface, 17, of the enclosure, 15, from the inner surface, 8, of the pressure vessel container, 3. This heater gas flow passage, 16, has an inlet end, 18, and an outlet end, 19. The enclosure, 15, comprises a gas flow inlet, 20, and a gas flow outlet, 21, and for the particular preferred example of this invention shown in FIG. 1, the enclosure gas flow inlet, 20, is positioned at the ash removal end, 6, of the enclosure, and the enclosure gas flow outlet, 21, is positioned at the refuel end, 4, of the enclosure.

C. A first separate gas flow connecting means, 22, connects the heater passage inlet end, 18, to the variable volume chamber, 14, of the combined compressor and expander, 9. In the preferred example of this invention shown in FIG. 1, the connecting means, 22, comprises a unidirectional gas flow means, 23, for creating unidirectional flow only from the variable volume chamber, 14, into the heater passage inlet end, 18.

D. A gas flow connecting means, 24, connects the heater passage outlet end, 19, to the gas flow inlet, 20, of the char fuel enclosure, 15, and this connecting means is always open in the preferred example of this invention shown in FIG. 1.

E. A second separate gas flow connecting means, 25, connects the enclosure gas flow outlet, 21, to the variable volume chamber, 14, of the combined compressor and expander, 9. In the preferred example of this invention shown in FIG. 1, the connecting means, 25, comprises a unidirectional gas flow means, 26, for creating unidirectional flow only from the enclosure outlet, 21, into the variable volume chamber, 14.

Driven valves are shown in FIG. 1 as the unidirectional flow means, 23, and 26, and these are shown as they are to be positioned during compression of the variable volume chamber, 14, with valve, 23, open and valve 26, closed. Hence during compression primary air flows from the variable volume chamber, 14, into the heater gas flow passage, 16, at its inlet end, 18, and then through the heater gas flow passage to its outlet end, 19, and then into the ash removal end, 6, of the char fuel enclosure, 15, via the always open connecting means, 24, and then into the interior of the char fuel enclosure, 15. Unidirectional flow means, 26, remains closed during compression of the variable volume chamber and thus no flow of gas occurs through the connecting means, 25, during compression.

During expansion valve, 23, is closed and valve, 26, is opened. Hence during expansion gas flows from the char fuel enclosure, 15, via its outlet end, 21, and via the connecting means, 25, into the variable volume chamber, 14, of the combined compressor and expander, 9. Unidirectional flow means, 23, remains closed during expansion of the variable volume chamber and thus no flow of gas occurs through the connecting means, 22, during expansion.

In the preferred example of this invention shown in FIG. 1 air enters the char fuel enclosure, 15, only into its ash removal end, 6, and primary reacted gases leave the char fuel enclosure only from its refuel end, 4. In this way gas flow is unidirectional through the char fuel enclosure, 15, from the ash removal end, 6, toward the refuel end, 4. The driven valves, 23 and 26, used to create unidirectional flow in the connecting means, 22 and 25, respectively can be driven by cams and mechanical or hydraulic links by various methods well known in the art of internal combustion engine mechanisms and these drive means are not shown in FIG. 1. Alternatively check valves can be used instead of the driven valves, to create the desired unidirectional flow.

The preferred example of this invention shown in FIG. 1 operates as follows:

1. During compression the primary air mass is forced from the variable volume chamber, 14, through the heater gas flow passage, 16, and then into the char fuel enclosure, 15, via the ash removal end, 6. In this way the primary air mass is preheated to a higher temperature. At the same time the air pocket of the heater gas flow passage, 16, functions as an insulation layer to reduce heat transfer from the hot char fuel inside the enclosure, 15. This preheating of the primary air and insulating of the char fuel both act to increase the temperature of the char fuel mass to well above its rapid reaction temperature, and this is beneficial object of this invention.

2. During expansion the reacted gas products of the primary reaction of char fuel with oxygen in the primary air flow from the char fuel enclosure, 15, via its refuel end, 4, into the variable volume chamber, 14. In this way these hot reacted gases flow over the fresh char fuel entering the enclosure, 15, via the refuel end, 4, from the refuel mechanism, 5, and act to increase the temperature of this fresh char fuel. This preheating of fresh char fuel being refueled acts to further increase the temperature of the char fuel mass undergoing reaction with the primary air mass, and this is another beneficial object of this invention.

3. Since only the primary air mass passes through the heater gas flow passage, 16, to be preheated therein, greater primary air preheat is achieved than would occur if portions of the secondary air were also preheated in the heater gas flow passage. The insulating effect of the heater gas flow passage, 16, is also greater when only the primary air mass passes therethrough than when portions of secondary air also passed into the heater gas flow passage.

4. The improvements of this invention are useable with those forms of char burning engines wherein the char fuel reaction chamber, 2, is contained within a pressure vessel container, 3, which is separate from the variable volume chamber, 14, of the combined means for compressing and expanding, 9, as shown in FIG. 1. Such char burning engine forms are described in U.S. Pat. No. 4,698,069, column 4, line 59, through column 5, line 11, and on FIG. 2, and this material is incorporated herein by reference thereto. An alternative form of char burning engine places the char fuel reaction chamber within the variable volume chamber of the combined compressor and expander as shown, for example, in U.S. Pat. No. 4,412,511, column 39, line 43, through column 40, line 64, and FIG. 10. In this latter form of char burning engine both primary air and secondary air surround the char fuel reaction chamber and act to cool the char fuel therein. Additionally not all of the primary air mass may be preheated before entering the char fuel reaction chamber with this form of char burning engine shown in FIG. 10. of U.S. Pat. No. 4,412,511.

Figure 2:
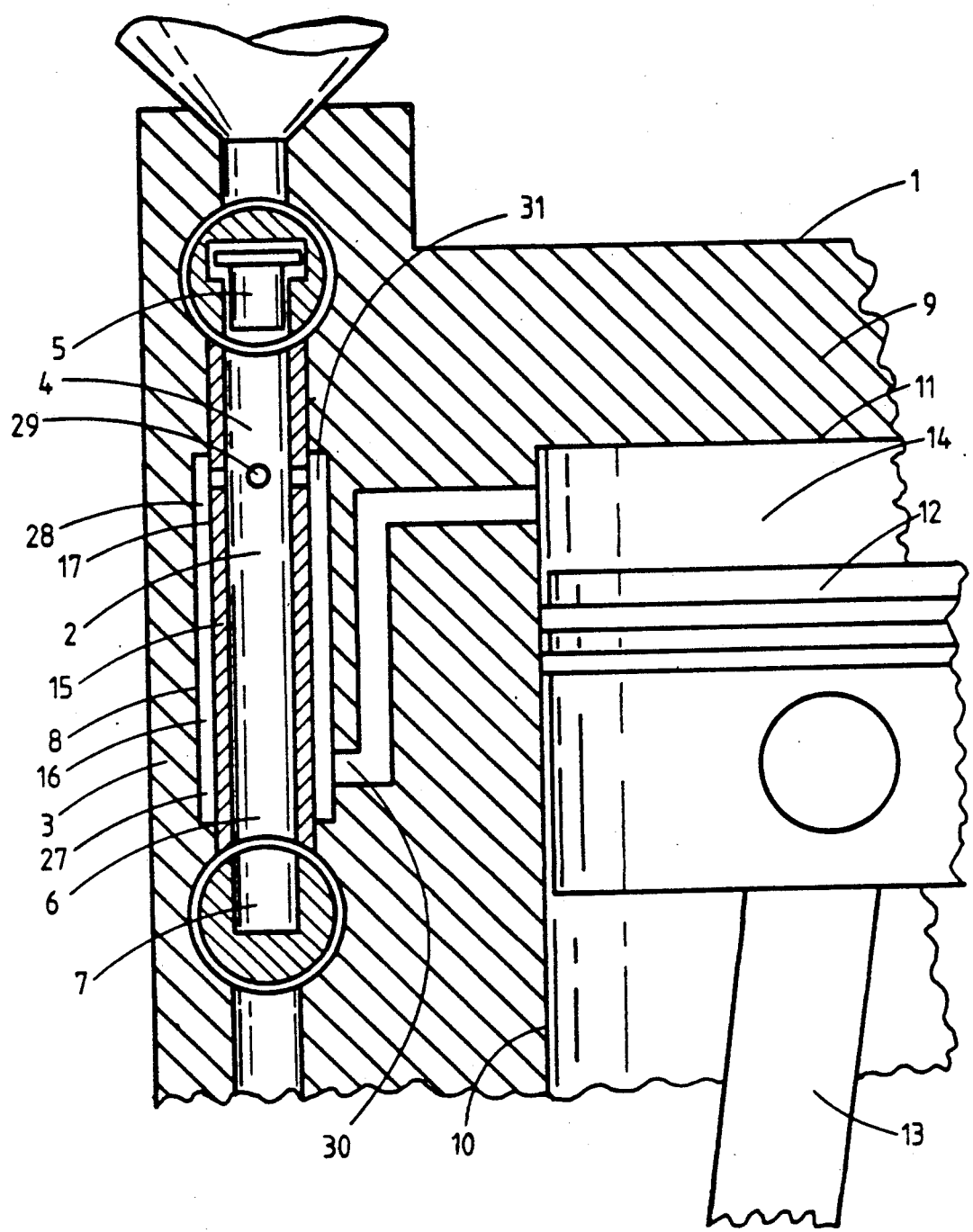

Another example form of this invention is shown in FIG. 2 and comprises:

A. A char buring engine, 1, as described hereinabove.

B. A char fuel enclosure means, 15, is positioned within the pressure vessel container, 3, with a heater gas flow passage, 16, separating most of the outer surface, 17, of the enclosure, 15, from the inner surface, 8, of the pressure vessel container, 3. This heater gas flow passage has an inlet end, 27, and an outlet end, 28. The enclosure, 15, comprises a gas flow connection, 29, preferably located at the refuel end, 4.

C. A connecting means, 30, for connecting the heater gas flow passage inlet, 27, to the variable volume chamber, 14, of the combined compressor and expander, 9.

D. A connecting means, 31, for connecting the heater gas flow passage outlet, 28, to the enclosure gas flow connection, 29.

The example form of this invention shown in FIG. 2 operates as follows:

1. During compression primary air flows from the variable volume chamber, 14 into the inlet, 27, of the heater gas flow passage, 16, via the connecting means, 30, and then through the heater gas flow passage to its outlet, 28, and then into the refuel end, 4, of the char fuel enclosure, 15, via the connecting means, 31, and the enclosure gas flow connection, 29. Only the primary air flows in this manner during compression and the primary air is preheated while passing through the heater gas flow passage, 16.

2. During expansion gas flows from the char fuel enclosure, 15, into the heater gas flow passage, 16, via the enclosure gas flow connection, 29, and the connecting means, 31, and then flows through the heater gas flow passage, 16, and then into the variable volume chamber, 14, via the connecting means, 30. Thus the gas flow directions during expansion are the reverse of the air flow directions during compression and unidirectional flow is not used in this example form of the invention shown in FIG. 2. During expansion the hot reacted gases formed by the primary reaction in the char fuel reaction chamber, 2, pass over the fresh char fuel entering the char fuel reaction chamber, 2, via its refuel end, 4, and the fresh char fuel is preheated in this way.

The example form of this invention shown in FIG. 2 is mechanically simpler than the preferred example form shown in FIG. 1 since the unidirectional flow means are not used in the FIG. 2 example. On the other hand the preheating of the fresh char fuel being refueled is less effective since relatively cold air also passes over this fresh char fuel during each compression process.

Other forms of this invention may also be used. For example, with new low or zero ash fuels an ash removal mechanism may be unnecessary, and hence the ash removal end of the char fuel enclosure is then the end opposite the refuel end of the enclosure. When unidirectional flow is also desired it can then be from the refuel end toward the opposite end of the char fuel enclosure, or vice versa.

Having thus described my invention what I claim is:

1. In a char burning engine comprising: a char fuel reaction chamber supplied with a char fuel mass therein and comprising a refuel end and an ash removal end and contained within a separate pressure vessel container means comprising an inner surface; combined means for compressing and expanding gases, said combined means comprising, an internal combustion engine mechanism comprising a variable volume chamber for compressing and expanding gases and drive means for driving said internal combustion engine mechanism and for varying the volume of said chamber through repeated cycles each cycle comprising a compression time interval followed by an expansion time interval, several gas flow connections into said variable volume chamber; an improvement comprising:

adding a char fuel enclosure means for enclosing the char fuel mass and comprising, an enclosure gas flow inlet, an enclosure gas flow outlet, an outer surface, a refuel end, and an ash removal end;

means for positioning said char fuel enclosure means between said char fuel mass and said pressure vessel container means, so that a heater gas flow passage exists between an appreciable portion of said outer surface of said char fuel enclosure means and said inner surface of said pressure vessel container means, and so that said heater gas flow passage comprises an inlet end and an outlet end;

adding a first separate unidirectional flow means for connecting said inlet end of said heater gas flow passage to said variable volume chamber of said combined means for compressing and expanding and comprising means for creating unidirectional flow of gas from said variable volume chamber into said heater gas flow passage inlet;

adding means for connecting said heater gas flow passage outlet end to said enclosure gas flow inlet;

adding a second separate unidirectional flow means for connecting said enclosure gas flow outlet to said variable volume chamber of said combined means for compressing and expanding and comprising means for creating unidirectional flow of gas from said char fuel enclosure means into said variable volume chamber;

whereby essentially only that air mass being compressed into the char fuel reaction chamber passes through the heater gas flow passage to be preheated therein, and additionally gas flow is unidirectional through the char fuel reaction chamber.

2. A char burning engine as described in claim 1:
  wherein said enclosure gas flow inlet is located at the ash removal end of said char fuel enclosure means; and further wherein said enclosure gas flow outlet is located at the refuel end of said char fuel enclosure means;
  whereby the unidirectional gas flow through the char fuel reaction chamber is from the ash removal end toward the refuel end.

3. In a char burning engine comprising: a char fuel reaction chamber supplied with a char fuel mass therein and comprising a refuel end and an ash removal end and contained within a separate pressure vessel container means for containing said char fuel reaction chamber, said pressure vessel container means comprising an inner surface; combined means for compressing and expanding gases, said combined means comprising, an internal combustion engine mechanism comprising a variable volume chamber for compressing and expanding gases and drive means for driving said internal combustion engine mechanism and for varying the volume of said chamber through repeated cycles each cycle comprising a compression time interval followed by an expansion time interval, several gas flow connections into said variable volume chamber; an improvement comprising;

adding a char fuel enclosure means for enclosing the char fuel mass and comprising, an enclosure gas flow inlet, an enclosure gas flow outlet, an outer surface, a refuel end, and an ash removal end;

means for positioning said char fuel enclosure means between said char fuel mass and said pressure vessel container means, so that a heater gas flow passage exists between an appreciable portion of said outer surface of said char fuel enclosure means and said inner surface of said pressure vessel container means, and so that said heater gas flow passage comprises an inlet end and an outlet end;

adding means for connecting said inlet end of said heater gas flow passage to said variable volume chamber of said combined means for compressing and expanding;

adding a first separate unidirectional flow means for connecting said outlet end of said heater gas flow passage to said enclosure gas flow inlet and comprising means for creating unidirectional flow of gas from said outlet end of said heater gas flow passage into said enclosure gas flow inlet;

adding a second separate unidirectional flow means for connecting said enclosure gas flow outlet to said variable volume chamber of said combined means for compressing and expanding and comprising means for creating unidirectional flow of gas from said char fuel enclosure means into said variable volume chamber;

whereby essentially only that air mass being compressed into the char fuel reaction chamber passes through the heater gas flow passage to be preheated therein, and additionally gas flow is unidirectional through the char fuel reaction chamber.

4. A char burning engine as described in claim 3:
  wherein said enclosure gas flow inlet is located at the ash removal end of said char fuel enclosure means;
  and further wherein said enclosure gas flow outlet is located at the refuel end of said char fuel enclosure means;
  whereby the unidirectional gas flow through the char fuel reaction chamber is from the ash removal end toward the refuel end.

5. In a char burning engine comprising: a char fuel reaction chamber supplied with a char fuel mass therein and comprising a refuel end and an ash removal end and contained within a separate pressure vessel container means for containing said char fuel reaction chamber, said pressure vessel container means comprising an inner surface; combined means for compressing and expanding gases, said combined means comprising, an internal combustion engine mechanism comprising a variable volume chamber for compressing and expanding gases and drive means for driving said internal combustion engine mechanism and for varying the volume of said chamber through repeated cycles each cycle comprising a compression time interval followed by an expansion time interval, several gas flow connections into said variable volume chamber;

an improvement comprising: adding a char fuel enclosure means for enclosing the char fuel mass and comprising, an enclosure gas flow connection, an outer surface, a refuel end, and an ash removal end;

means for positioning said char fuel enclosure means between said char fuel mass and said pressure vessel container means, so that a heater gas flow passage exists between an appreciable portion of said outer surface of said char fuel enclosure means and said inner surface of said pressure vessel container means, and so that said heater gas flow passage comprises an inlet end and an outlet end;

adding means for connecting said inlet end of said heater gas flow passage to said variable volume chamber of said combined means for compressing and expanding;

adding means for connecting said outlet end of said heater gas flow passage to said enclosure gas flow connection;

whereby essentially only that air mass being compressed into the char fuel reaction chamber passes through the heater gas flow passage to be preheated therein during said compression time interval.

* * * * *